US012808306B2

(12) United States Patent
Sasao et al.

(10) Patent No.: US 12,808,306 B2
(45) Date of Patent: Nov. 24, 2026

(54) STEAM TURBINE

(71) Applicant: MITSUBISHI HEAVY INDUSTRIES, LTD., Tokyo (JP)

(72) Inventors: Yasuhiro Sasao, Tokyo (JP); Tetsuaki Kimura, Tokyo (JP); Kiyoshi Segawa, Tokyo (JP); Takeshi Kudo, Tokyo (JP); Soichiro Tabata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/117,781

(22) PCT Filed: Oct. 13, 2023

(86) PCT No.: PCT/JP2023/037267
§ 371 (c)(1),
(2) Date: Apr. 2, 2025

(87) PCT Pub. No.: WO2024/090253
PCT Pub. Date: May 2, 2024

(65) Prior Publication Data

US 2026/0117674 A1 Apr. 30, 2026

(30) Foreign Application Priority Data

Oct. 26, 2022 (JP) ................................ 2022-171274

(51) Int. Cl.
*F01D 25/10* (2006.01)

(52) U.S. Cl.
CPC .......... *F01D 25/10* (2013.01); *F05D 2220/31* (2013.01); *F05D 2260/212* (2013.01)

(58) Field of Classification Search
CPC . F01D 25/10; F05D 2220/31; F05D 2260/212
See application file for complete search history.

(56) References Cited

U.S. PATENT DOCUMENTS 3,997,758 A * 12/1976 Patel ...................... F01D 25/10 392/362
10,316,697 B2 * 6/2019 Wang .................... F01D 25/305

FOREIGN PATENT DOCUMENTS

DE 102005046720 A1 4/2007
JP H4-262001 A 9/1992
JP 2010151056 A * 7/2010

(Continued)

OTHER PUBLICATIONS

Machine Translation of JP2010151056, Generated 2026 (Year: 2010).*

(Continued)

*Primary Examiner* — Eldon T Brockman
(74) *Attorney, Agent, or Firm* — WHDA, LLP

(57) ABSTRACT

This steam turbine comprises: a stator blade; a turbine casing accommodating the stator blade and the rotor blade; and a nano water droplet supply device for supplying steam containing atomized water droplets to the turbine casing. The nano water droplet supply device supplies, to main steam, nano water droplets with a $D_{10}$ particle size of 0.5 μm or less, which is an arithmetic mean of particle sizes of the water droplets, and a mass ratio of not less than 0.01% and not greater than 0.5% with respect to the main steam that flows into the turbine casing.

2 Claims, 4 Drawing Sheets

(56) References Cited

FOREIGN PATENT DOCUMENTS

JP 2014-181670 A 9/2014

OTHER PUBLICATIONS

International Search Report dated Nov. 14, 2023, issued in counterpart Application No. PCT/JP2023/037267. (9 pages).
Notification of Transmittal of Translation of the International Preliminary Report on Patentability(Form PCT/IB/338) issued in counterpart International Application No. PCT/JP2023/037267 mailed May 8, 2025 with Forms PCT/IB/373, PCT/ISA/237 and PCT/IB/326. (12 pages).
Office Action dated Dec. 6, 2023, issued in counterpart JP Application No. 2022-171274, with English translation. (8 pages).

* cited by examiner

STEAM TURBINE

TECHNICAL FIELD

The present disclosure relates to a steam turbine.

The present application claims priority based on Japanese Patent Application No. 2022-171274 filed in Japan on Oct. 26, 2022, the contents of which are incorporated herein by reference.

BACKGROUND ART

When steam in a turbine casing is in a supercooled state, a volume flow rate decreases, so that the flow speed of the steam flowing into the blade row significantly decreases from the design point, and a significant decrease in performance occurs. In addition, latent heat released as the steam returns from the supercooled state to the equilibrium state is discharged to the outside of the system, so that a thermal loss also occurs. In order to suppress such a supersaturation loss (supercooling loss) in the steam turbine, the steam turbine disclosed in PTL 1 calculates a supersaturation region distribution of a steam flow, and injects wet steam in a downstream direction of the steam flow based on the calculated supersaturation region distribution. In PTL 1, an average particle size of water droplets contained in the wet steam is 1 μm or less in terms of a median diameter.

CITATION LIST

Patent Literature

[PTL 1] Japanese Unexamined Patent Application Publication No. 2014

SUMMARY OF INVENTION

Technical Problem

In order to realize efficient operation of a steam turbine, further suppression of a supersaturation loss is required.

An object of the present disclosure is to provide the steam turbine that can suppress a supersaturation loss without causing a heat loss of the working steam and can improve an operation efficiency.

Solution to Problem

A steam turbine according to at least one embodiment of the present disclosure includes: a stator blade; a rotor blade; a turbine casing that accommodates the stator blade and the rotor blade; and a nano water droplet supply device that supplies steam containing atomized water droplets to the turbine casing, the nano water droplet supply device supplies nano water droplets in which a $D_{10}$ particle size, which is an arithmetic average of particle sizes of the water droplets, is 0.5 μm (500 μm) or less, and a mass ratio to main steam flowing into the turbine casing is 0.01% or more and 0.5% or less. Here, in the present specification, the nano water droplets indicate the water droplets having a particle size of 0.5 μm or less.

Advantageous Effects of Invention

According to the present disclosure, it is possible to provide the steam turbine that can suppress a supersaturation loss without causing a heat loss of the working steam and can improve an operation efficiency.

DESCRIPTION OF EMBODIMENTS

Figure 1:
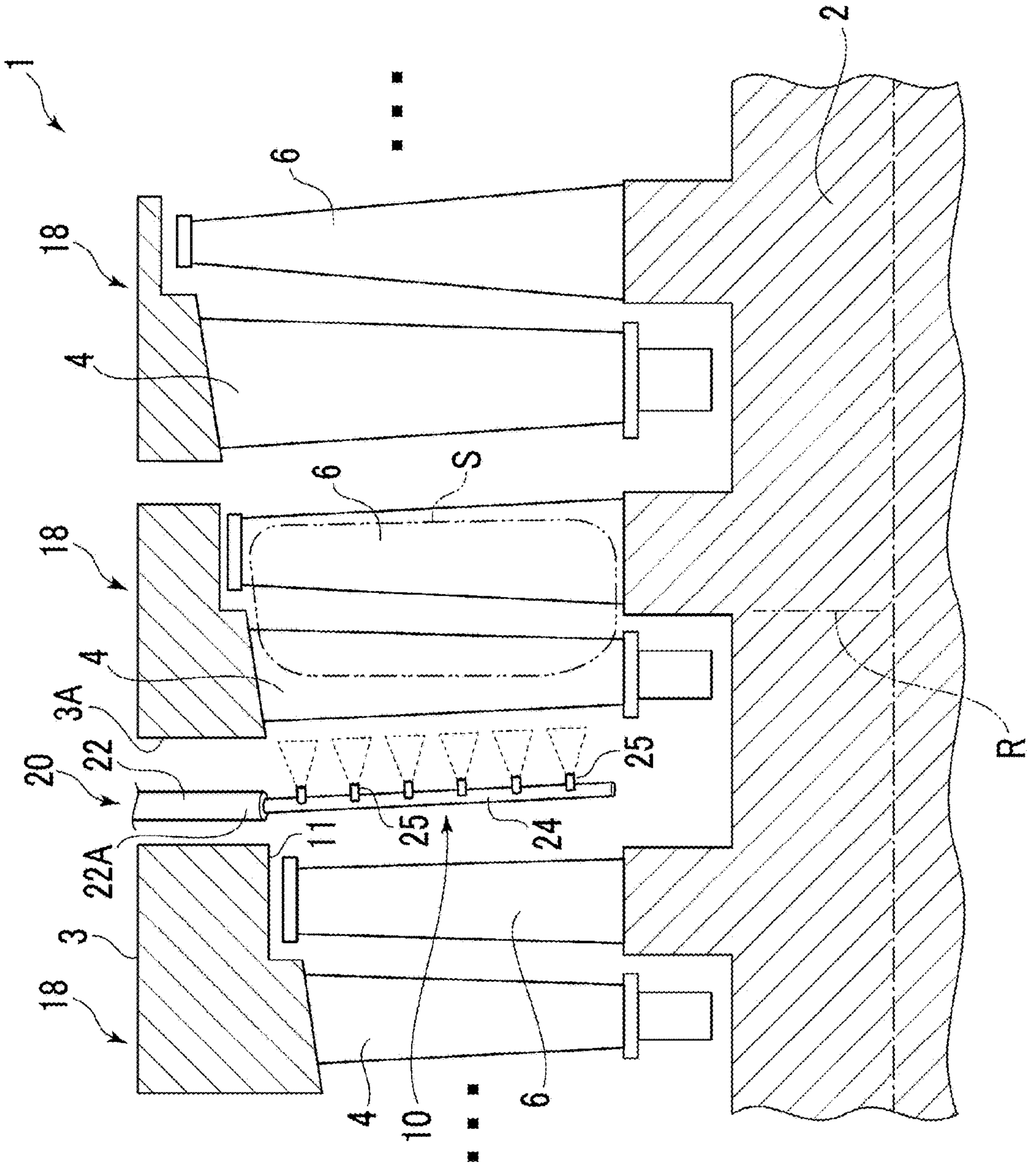
FIG. 1 is a schematic diagram showing a cross section of a steam turbine according to an embodiment.

Hereinafter, several embodiments of the present disclosure will be described with reference to the accompanying drawings. However, dimensions, materials, shapes, and relative dispositions of components described as the embodiments or illustrated in the drawings are not intended to limit the scope of the present disclosure, and are merely examples for describing the present disclosure.

For example, expressions representing relative or absolute dispositions such as "in a certain direction", "along a certain direction", "parallel". "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same". "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an uneven portion or a chamfered portion within a range where the same effect can be obtained.

Meanwhile, expressions such as "being provided with", "including", or "having" one component are not exclusive expressions excluding existence of other components.

The same configurations are denoted by the same reference numerals, and the description thereof may be omitted.

<Outline of Steam Turbine 1>

FIG. 1 is a schematic diagram showing a cross section of a steam turbine 1 according to an embodiment of the present disclosure. The steam turbine 1 includes a rotor 2, a plurality of rotor blades 6 fixed to an outer peripheral surface of the rotor 2, and an inner casing 3 that accommodates the rotor 2 and the plurality of rotor blades 6. A turbine casing 11 in which a plurality of stator blades 4 are fixed is formed on an inner peripheral side of the inner casing 3. The turbine casing 11 accommodates the rotor 2, the plurality of stator blades 4, and the plurality of rotor blades 6. Then, a steam passage 10 is formed between the turbine casing 11 and the rotor 2.

In the present example, a plurality of stator blades 4 arranged in a circumferential direction on an outer peripheral surface of the rotor 2 and a plurality of stator blades 4 arranged in the circumferential direction are alternately disposed along the axial direction of the rotor 2. Then, the plurality of stator blades 4 and the plurality of rotor blades 6 adjacent to each other in the axial direction constitute the turbine stage 18. The plurality of rotor blades 6 constituting the turbine stage 18 are located on the downstream side (a right side in the example of FIG. 1) in the steam flow direction with respect to the plurality of stator blades 4.

In the steam turbine 1 having the above-described configuration, the working steam (also referred to as a main steam or a turbine steam) introduced into the turbine casing 11 as a working fluid from a casing inlet (not illustrated) flows through the steam passage 10. Then, the steam flow that has been expanded and accelerated when passing through the stator blade 4 in the steam passage 10 does work on the rotor blade 6, and as a result, the rotor 2 is rotationally driven.

<Nano Water Droplet Supply Device 20 According to Embodiment 22

A nano water droplet supply device 20 according to an embodiment of the present disclosure will be described with reference to FIG. 1. In the present application, fine water droplets having a particle size smaller than 0.5 μm are defined as nano water droplets. First, an outline of the nano water droplet supply device 20 will be described. At least a portion of the main steam, which is the steam flowing into the turbine casing 11 from the casing inlet, is condensed in the process of flowing through the steam passage 10. The main steam does not start to condense until a certain degree of supersaturation is reached in the expansion process. It is known that the temperature of the steam when condensation starts is temporarily lower than the saturation temperature, and this is called a supercooling phenomenon. The inventors have conceived that in order to suppress the supercooling phenomenon, it is sufficient to prepare an environment in which the water molecules constituting the main steam easily grow and turn into liquid droplets in the turbine casing 11. Then, the inventors have conceived with the nano water droplet supply device 20 for intentionally generating an environment of the turbine casing 11 in which the supercooling phenomenon can be suppressed.

An example of a configuration of the nano water droplet supply device 20 configured to supply the fluid accompanied by the water droplets generated by condensation in the supersaturated steam formed inside the nano water droplet supply device 20, for example, the accompanied steam or the accompanied air containing a very small amount of water molecules compared to the main steam, to the turbine casing 11 will be described. The nano water droplet supply device 20 includes a nano water droplet supply source (not shown), a nano water droplet conduit tube 22 connected to the nano water droplet supply source, and a nano water droplet spraying unit 24 for spraying the nano water droplets guided by the nano water droplet conduit tube 22 into the turbine casing 11.

As an example, the nano water droplet supply source includes a chamber that stores pure water and an oscillator that sinks in the stored pure water, and is configured such that the nano water droplets are generated from a water surface of the pure water by the vibration of the oscillator. The frequency and output of the oscillator are adjusted, so that the particle size of the nano water droplets and the flow rate of the nano water droplets can be controlled. Therefore, the nano water droplet supply source can supply the accompanied fluid (for example, the accompanied steam containing water molecules) containing the atomized water droplets.

The nano water droplet conduit tube 22 includes one end (not illustrated) connected to the nano water droplet supply source and the other end 22A disposed inside the hole 3A penetrating the inner casing 3. The nano water droplet spraying unit 24 is a pipe connected to the other end 22A of the nano water droplet conduit tube 22, and extends along the radial direction of the rotor 2. The nano water droplet spraying unit 24 is disposed on the inlet side (an upstream side of the stator blade 4 or the rotor blade 6) of any of the turbine stages 18. In addition, the nano water droplet spraying unit 24 includes a plurality of nozzles 25 for spraying the accompanied fluid containing the nano water droplets guided from the nano water droplet conduit tube 22, and the plurality of nozzles 25 are disposed at intervals along the radial direction of the rotor 2. Each nozzle 25 is open toward the downstream side (a right side in the example of FIG. 1) in the steam passage 10.

In the nano water droplet supply device 20 having the above-described configuration, the accompanied fluid containing the atomized water droplets supplied from the nano water droplet supply source to the nano water droplet spraying unit 24 via the nano water droplet conduit tube 22 is sprayed into the turbine casing 11 from the plurality of nozzles 25 and is mixed with the main steam.

The nano water droplet supply device 20 of the present disclosure is configured to supply steam in which the $D_{10}$ particle size of the water droplets to be supplied is 0.5 μm or less and the mass ratio of the water droplets supplied to the main steam is 0.01% or more and 0.5% or less. The $D_{10}$ particle size is the particle size of the water droplets corresponding to the arithmetic average of the particle sizes of the water droplets, and the $D_{10}$ particle size being 0.5 μm or less means that the arithmetic average of the particle sizes of the water droplets is 0.5 μm or less.

Here, the particle size of the water droplets will be described. It is known that, inside the steam turbine 1, the particle size of water droplets generated by uniform nucleation from steam in a supercooled state has a relatively uniform particle size due to thermodynamic action. On the other hand, in the spray, water droplets generated by the motion dynamic action have a wide water droplet diameter distribution, and various definitional equations are adopted in the description of the average water droplet diameter, including the median diameter. However, in terms of the average water droplet diameter inside the steam turbine 1, it is rare in both academic and engineering fields to define the average water droplet diameter by the median diameter, and it is more common to adopt the average water droplet diameter defined by the general mean diameter shown in Equation (1).

[Equation 1]

$$D[p,q] = D_{pq} = \left(\frac{\sum D^p}{\sum D^q}\right)^{p-q} \tag{1}$$

Here, it is obvious that Equation (1) means the arithmetic average particle size when p=1 and q=0. The critical nucleus radius of the nanometer-sized ultrafine water droplets generated by the uniform nucleation is governed by the surface tension of water and the Gibbs free energy depending on the steam conditions, and thus the particle size is relatively uniform. Therefore, in the present application, in a case of discussing the effect of reducing the supersaturation loss by spraying the nano water droplets, it can be determined that expressing the water droplets by the Die particle size is simpler and more reasonable in understanding the average water droplet diameter. In the present application, unless otherwise specified, the $D_{10}$ particle size is defined as the arithmetic average diameter according to the definition of the general mean diameter, and no notation by the median diameter is adopted.

According to the above-described configuration, the main steam, which is the steam that has flowed into the turbine casing 11 from the casing inlet, can grow into the water droplets with the nano water droplets supplied by the nano water droplet supply device 20 as nuclei. Accordingly, the supercooling phenomenon that occurs in the process of condensing the main steam is suppressed, and as a result, the moisture loss can be reduced. As described above, the steam turbine 1 that can suppress the supersaturation loss and can improve the operation efficiency is realized.

The supersaturation region S is formed in the turbine casing 11 as shown in FIG. 1. The supersaturation region S is a region (space) in the turbine casing 11 in which at least a portion of the main steam is in a supersaturated state and starts to condense during the operation of the steam turbine 1. The main steam changes from a superheated state to a saturated state on the upstream side (a left side of the region S in the example of FIG. 1) of the supersaturation region S, and the supercooling progresses in the supersaturation region S, so that the degree of supersaturation increases, and the condensation nuclei are generated and grow into water droplets. That is, a supercooling phenomenon of the main steam occurs in a process in which the main steam passes through the supersaturation region S. A place where the supersaturation region S is formed changes depending on the conditions of the steam turbine 1 during operation. For example, the higher the temperature of the main steam at the casing inlet, the more the supersaturation region S is formed on the downstream side.

The nano water droplet spraying unit 24 of the nano water droplet supply device 20 according to the embodiment of the present disclosure is disposed on the upstream side of the supersaturation region S formed in the turbine casing 11 regardless of the conditions of the steam turbine 1 during operation. According to the above-described configuration, the nano water droplet supply device 20 can spray the nano water droplets toward the supersaturation region S where the supercooling phenomenon occurs. Therefore, the condensation of the main steam in the supersaturation region S is promoted, and latent heat is released. In this manner, the supersaturation loss can be effectively suppressed.

<Relationship Between Nano Water Droplets Supplied by Nano Water Droplet Supply Device 20 and Supersaturation Loss>

Figure 3:
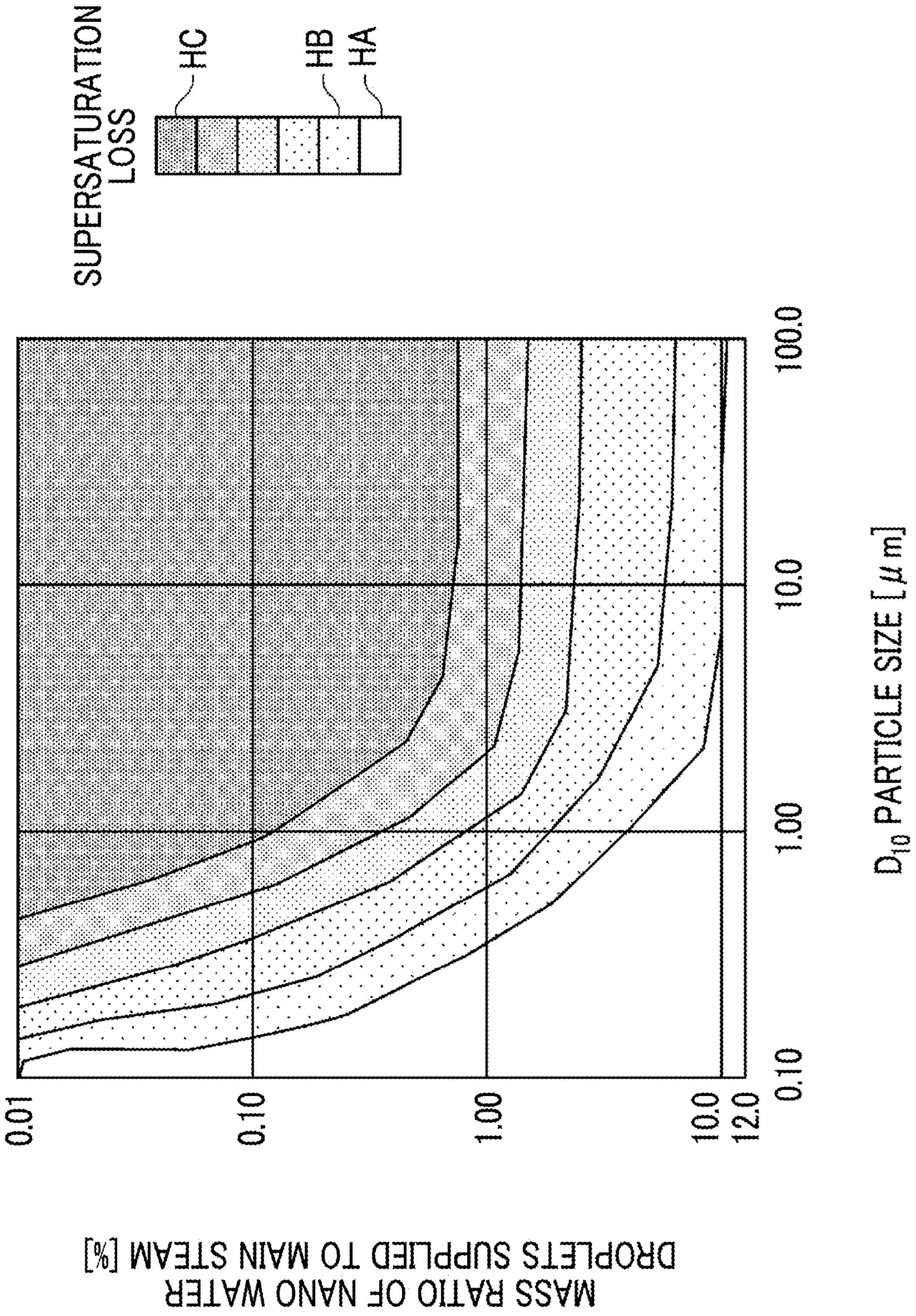
FIG. 3 is a schematic diagram showing a result obtained by simulation of a relationship between water droplets supplied by a nano water droplet supply device according to the embodiment and a supersaturation loss.

FIG. 3 is a conceptual diagram obtained by simulation of a relationship between the water droplets supplied by the nano water droplet supply device 20 and the supersaturation loss. The conditions of the simulation are as follows. The analysis was performed under a wide range of temperature condition in which the inlet pressure was 3.0 ata, the inlet temperature was 130° C. to 320° C., and the condition at the turbine inlet changed from a dry steam to a wet steam. Further, in order to investigate how the breakdown of the loss in the stage changes with respect to the stage inlet wetness, under a condition where the inlet is saturated, an analysis was performed in which the turbine inlet wetness was varied from 0% to 12%. Further, under the inlet wet condition, an analysis in which the water droplet diameter was varied from 0.1 μm to 100 μm was performed, and the two parameters, that is, the inlet water droplet diameter and the wetness (mass ratio of the water droplets supplied to the main steam) were analyzed in detail in terms of sensitivity to the breakdown of the moisture loss, particularly the amount of occurrence of the supersaturation loss.

The horizontal axis of the graph in FIG. 3 represents the $D_{10}$ particle size of the water droplets supplied by the nano water droplet supply device 20, and the vertical axis represents the mass ratio of the water droplets supplied to the main steam. In the graph, the supersaturation loss indicated by the dense hatching region is larger than the supersaturation loss indicated by the region that is not the dense hatching region. For example, the supersaturation loss in the region indicated by the hatching HC is larger than the supersaturation loss in the region indicated by the hatching HB. In addition, the supersaturation loss in the region indicated by the reference numeral HA is smaller than the supersaturation loss in the region indicated by the hatching HB.

As can be seen from FIG. 3, the smaller the $D_{10}$ particle size is, the more the supersaturation loss tends to be reduced. This is because, in a case where the total volume of the supplied water droplets is constant (the mass ratio of the water droplets supplied to the main steam is constant), the smaller the particle size of the water droplets, the more the number of water droplets increases, and the total surface area of the water droplets increases. As the total surface area increases, the opportunity for the nano water droplets supplied by the nano water droplet spraying unit 24 to come into contact with the water molecules constituting the main steam increases. Therefore, the latent heat is released in a process in which the nano water droplets come into contact with the main steam, take in steam, and grow, so that the supercooling phenomenon of the main steam is suppressed. In addition, in the simulation, the supersaturation loss (a region indicated by reference numeral HA) of the lowest classification was confirmed in a graph region in which the $D_{10}$ particle size of the water droplets was 0.5 μm (500 nm) or less, for example, under a condition in which the mass ratio of the water droplets supplied to the main steam was 1%. Then, it was confirmed that in the above-described graph region, the ratio of the region indicated by the reference numeral HA is high in the graph region where the mass ratio of the water droplets supplied to the main steam is 0.01% or more. On the other hand, as shown in FIG. 3, it has been found that under a condition where the $D_{10}$ particle size is constant, the supersaturation loss decreases as the mass ratio of the nano water droplets supplied from the nano water droplet supply device 20 to the main steam increases. This is because, even in a case where the particle size is the same, when the mass ratio of the nano water droplets supplied to the main steam is high, the total surface area of the water droplets (surface area of each water droplet× number of water droplets) increases, so that the average free path until the water molecules reach the water droplets is reduced, and the release of latent heat due to condensation becomes active, and the supersaturation loss is reduced.

From the above, it was found that when the $D_{10}$ particle size of the water droplets supplied by the nano water droplet supply device 20 is 0.5 μm (500 nm) or less and the mass ratio of the water droplets supplied to the main steam is 0.01% (that is, 0.0001) or more, the supersaturation loss of the steam turbine 1 is effectively suppressed.

In general, as the number of water droplets supplied increases as shown in the Baumann rule, the moisture loss such as a pump loss, a braking loss, and an acceleration loss becomes larger than the effect of reducing the supersaturation loss due to the increase in the number of nano water droplets, and the moisture loss of the steam turbine 1 increases. Therefore, the moisture loss as a whole increases, and the performance is not improved. In the present application, according to the Baumann rule, it is assumed that the turbine efficiency is reduced by 1% due to an increase in various moisture loss with respect to the additional water droplet mass flow rate of 1%.

Figure 2:
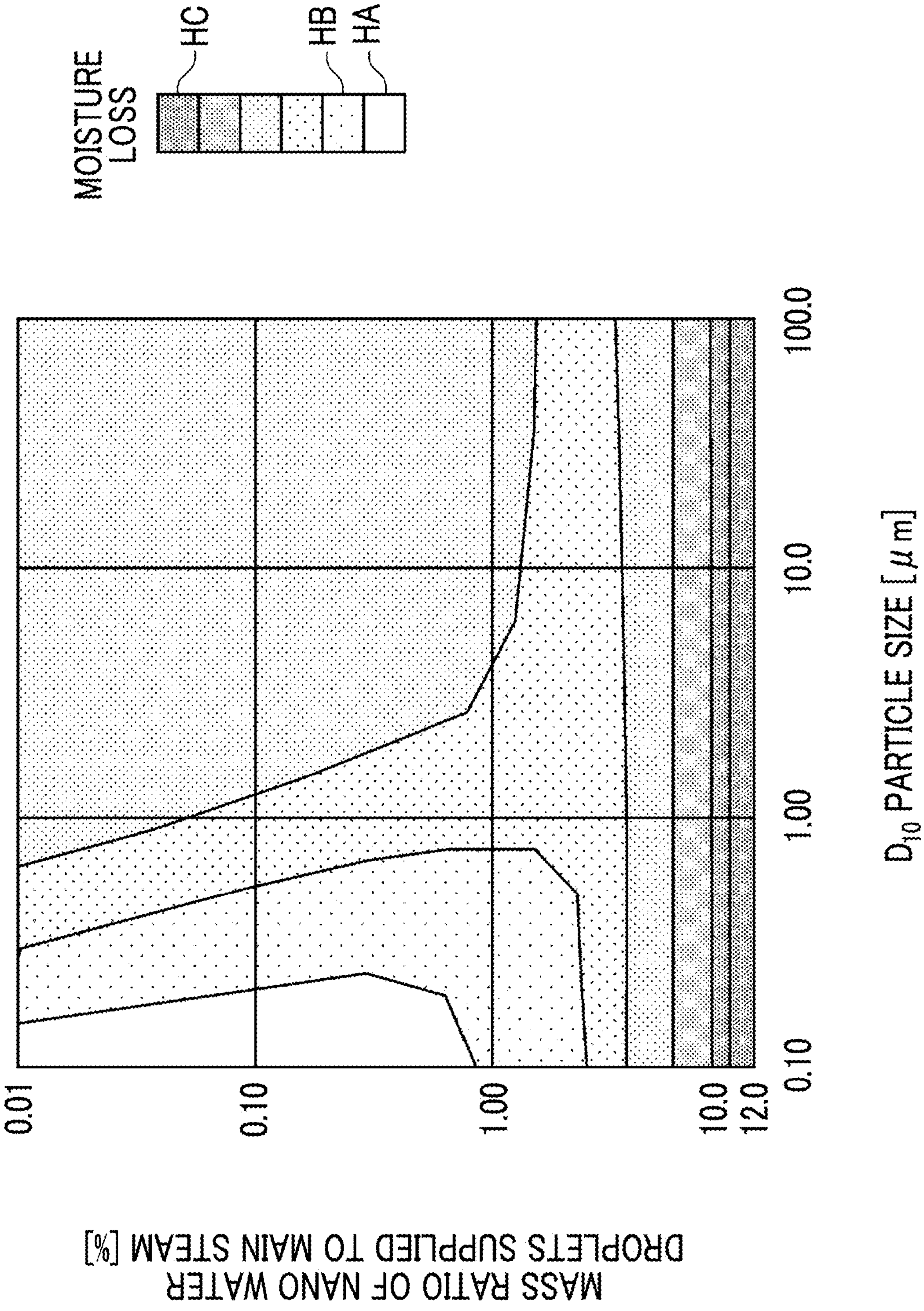
FIG. 2 is a schematic diagram showing a result obtained by simulation of a relationship between water droplets supplied by a nano water droplet supply device according to the embodiment and a total moisture loss.

FIG. 2 is a conceptual diagram obtained by simulation of a relationship between the water droplets supplied by the nano water droplet supply device 20 and the total moisture loss due to a pump loss, a braking loss, an acceleration loss, and the like. The conditions of the simulation are the same as those in the case of the supersaturation loss shown in FIG. 3. In the graph, the moisture loss indicated by the dense hatching region is larger than the moisture loss indicated by the region that is not the dense hatching region. For example, the moisture loss in the region indicated by the hatching HC is larger than the moisture loss in the region indicated by the hatching HB. In addition, the total moisture loss in the region indicated by the reference numeral HA is smaller than the moisture loss in the region indicated by the hatching HB.

In a case where the total volume of the supplied water droplets is constant (the mass ratio of the water droplets supplied to the main steam is constant), a tendency that the smaller the particle size, the smaller the moisture loss is similar to a case of the supersaturation loss shown in FIG. 3. For example, it can be seen that when the mass flow rate of the water droplets supplied from the nano water droplet supply device 20 is 0.5% of the main steam mass flow rate, the smaller the $D_{10}$ particle size, the more the effect of reducing the moisture loss can be expected. However, for example, when the particle size is in a range of 0.5 μm or less, the moisture loss tends to increase when the mass ratio of the water droplets supplied to the main steam exceeds 0.5%. That is, in a case where an excessive number of water droplets are added, the total moisture loss due to the addition of the water droplets exceeds the gain due to the reduction in the supersaturation loss. As long as the water droplet diameter is the same, the larger the water droplet mass flow rate, the more the effect of reducing the supersaturation loss can be expected. However, the moisture loss other than the supersaturation loss increases in proportion to the water droplet flow rate. Therefore, the overall moisture loss is minimized at an appropriate water droplet flow rate. That is, the heat loss of the working steam (main steam) can be avoided.

Therefore, in order to suppress an increase in moisture loss due to the supplied water droplets while reducing the supersaturation loss by supplying the water droplets using the nano water droplet supply device 20, the particle size of the nano water droplets may be made as small as possible, and may be 0.5 μm or less. Further, it was found that when the mass ratio of the supplied nano water droplets is 0.01% or more and 0.5% or less, the total moisture loss including the supersaturation loss can be suppressed.

<Relationship between Supersaturation Loss and Moisture Loss>

The inventors have performed an operation simulation in which a steam turbine 1 is applied to a low-pressure turbine installed in a thermal power generation plant. In the operating conditions in the simulation, the steam flow rate supplied to the steam turbine 1 is 360 ton/h, and the wetness at the outlet of the turbine stage 18 located at the most downstream is 11%. Although detailed illustration is omitted, as a result of the simulation, it was found that the supersaturation loss accounts for about 60% of the moisture loss of the steam turbine 1. From this result, it can be confirmed that the operation efficiency of the steam turbine 1 is improved by suppressing the supersaturation loss. The moisture loss includes, in addition to the supersaturation loss, an acceleration loss, a capture loss, a pump loss, a braking loss, a condensation loss, and the like. In the present simulation, the ratio of each loss is also specified, but the detailed description thereof will be omitted.

<Relationship between Operating Condition and Moisture Loss>

Figure 4:
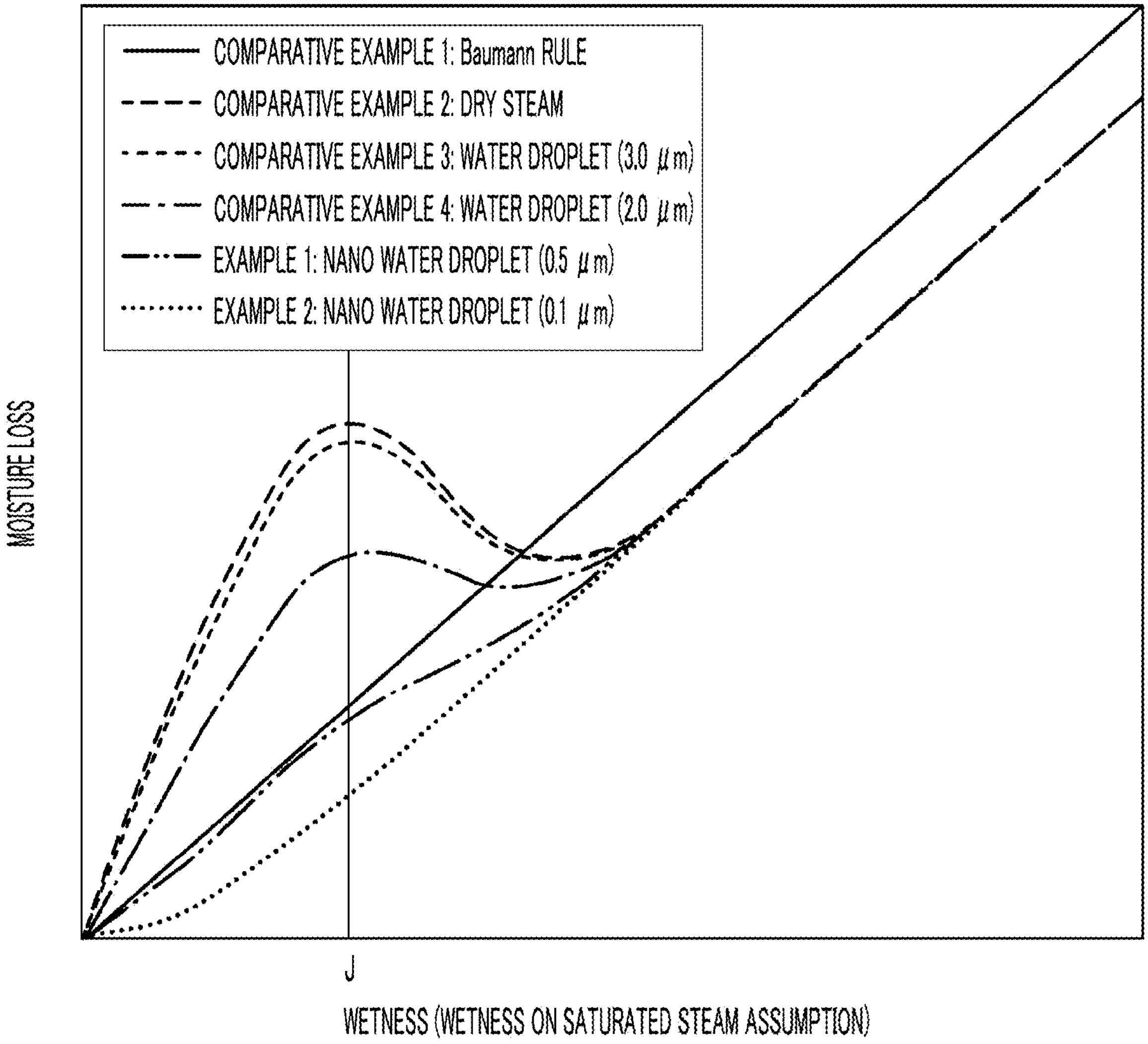
FIG. 4 is a schematic graph showing a result obtained by simulation of a relationship between an operating condition and a moisture loss of the steam turbine according to the embodiment.

FIG. 4 is a schematic graph showing a result of specifying a relationship between the stage-average wetness on a saturated steam assumption and the moisture loss under the operating conditions of the steam turbine 1 by simulation. The wetness on the saturated steam assumption is the wetness of a static field determined by the state of the pressure or temperature of the saturated steam. In the actual steam turbine, supercooling due to adiabatic expansion or removal of moisture by a wall surface occurs, and thus the wetness on the saturated steam assumption and the actual wetness do not coincide with each other. However, in order to calculate the actual wetness, an advanced simulation based on numerical fluid dynamics is required, and the wetness on the saturated steam assumption is currently used for estimating the moisture loss in the design. For example, in a low-pressure steam turbine, it is known that condensation does not actually occur unless a steam pressure corresponding to about 3% (value corresponding to "J" in the same graph) is reached in the wetness on the saturated steam assumption. The horizontal axis of the same graph indicates the average value of the wetness on the saturated steam assumption of the inlet and the outlet of the turbine stage 18 immediately downstream of the nano water droplet spraying unit 24, and the vertical axis indicates the moisture loss generated in the turbine stage 18.

In "Comparative Example 1: Baumann rule" in the same graph, when the stage average value of the wetness on the saturated steam assumption of any turbine stage 18 increases by 1%, the efficiency of the turbine stage 18 decreases by 1%. The amount of decrease in the stage efficiency that occurs as the wetness on the saturated steam assumption increases is called a moisture loss. In a case where the nano water droplet supply device 20 is not provided, it is understood that the moisture loss shown in Comparative Example 1 occurs approximately. "Comparative Example 2: dry steam" in the same graph shows the relationship between the wetness on the saturated steam assumption and the moisture loss in a case where dry steam is supplied from the nano water droplet spraying unit 24. "Comparative Example 3: water droplet (3.0 μm)" shows the relationship between the wetness on the saturated steam assumption and the moisture loss in a case where the water droplets having the $D_{10}$ particle size of 3.0 μm and the mass ratio to the main steam of 0.1% are supplied, and a curve similar to that of the dry steam is drawn. On the other hand, "Comparative Example 4: water droplets (2.0 μm)" in the same graph shows the relationship between the wetness on the saturated steam assumption of the downstream stage and the moisture loss in a case where water droplets having a $D_{10}$ particle size of 2.0 μm and a mass ratio to the main steam of 0.1% are supplied. Regardless of whether water droplets are supplied or not, the main steam undergoes a phase change and an increase in wetness in the process of expansion. The effect of reducing the supersaturation loss that occurs in the process was hardly observed in the water droplets of 2.0 μm or more (that is.

Comparative Examples 2 and 3). In the same graph, "Example 1: nano water droplets (0.5 μm)" and "Example 2: nano water droplets (0.1 μm)" respectively indicate the relationship between the wetness on the saturated steam assumption and the moisture loss in a case where water droplets having a $D_{10}$ particle size of 0.5 μm (500 nm) and nano water droplets having a $D_{10}$ particle size of 0.1 μm (100 nm) are supplied with a mass ratio to the main steam of 0.1%. As can be seen from the comparison between Comparative Example 1 and Examples 1 and 2, it is understood that when the nano water droplet spraying unit 24 sprays the nano water droplets under the conditions of Examples 1 and 2, the supersaturation loss is suppressed.

In addition, as can be seen from the comparison of "Comparative Example 1". "Comparative Example 2", "Comparative Example 3", "Comparative Example 4", "Example 1", and "Example 2", it was confirmed that the moisture loss in "Example 1" and "Example 2" is relatively low and the operation efficiency of the steam turbine 1 is highest in a range where the wetness is more than 0% and 5% or less (not shown). In addition, as shown in "Comparative Example 3" and "Comparative Example 4", it was confirmed that when the particle size of the water droplets supplied from the nano water droplet spraying unit 24 is 2.0 μm or more in terms of $D_{10}$ particle size, the reduction effect on the supersaturation loss that occurs in a region where the wetness on the saturated steam assumption is 5% or less is hardly exhibited. This means that the smaller the water droplets, the greater the effect of reducing the supersaturation loss, and the larger the water droplets, the smaller the effect of reducing the supersaturation loss.

From the above results, it is understood that when the particle size of the water droplets supplied by the nano water droplet spraying unit 24 is equal to or smaller than 0.5 μm (500 nm) at a $D_{10}$ particle size and the mass ratio of the water droplets to the main steam in the nano water droplet spraying unit 24 is equal to or larger than 0.01% and equal to or smaller than 0.5%, the supersaturation loss is suppressed and the operation efficiency of the steam turbine 1 is improved.

SUMMARY

The contents described in some embodiments described above are understood as follows, for example.

1) A steam turbine (1) according to at least one embodiment of the present disclosure includes: a stator blade (4); a rotor blade (6); a turbine casing (11) that accommodates the stator blade (4) and the rotor blade (6); and a nano water droplet supply device (20) that supplies steam containing atomized water droplets to the turbine casing (11), the nano water droplet supply device (20) being for supplying nano water droplets in which a $D_{10}$ particle size, which is an arithmetic average of particle sizes of the water droplets, is 0.5 μm or less, and a mass ratio to main steam flowing into the turbine casing is 0.01% or more and 0.5% or less, to the main steam.

According to the configuration of 1) as described above, the main steam (working steam) which is the steam that has flowed into the turbine casing (11) from the casing inlet can undergo a phase change with the nano water droplets supplied by the nano water droplet supply device (20) as nuclei. Accordingly, the supercooling phenomenon that occurs as the condensation of the main steam is delayed is suppressed, and as a result, the moisture loss can be reduced. As described above, the steam turbine (1) that suppresses supersaturation loss without causing a heat loss of the working steam and improves the operation efficiency is realized. The accompanied steam mass flow rate for supplying the water droplets is small enough to be negligible compared to the main steam mass flow rate.

2) In some embodiments, in the steam turbine (1) according to 1), the nano water droplet supply device (20) includes the nano water droplet spraying unit (24) configured to spray the steam on the upstream side of the supersaturation region(S) occurring inside the turbine casing (11).

According to the configuration of 2), the nano water droplet spraying unit (24) can spray the nano water droplets toward the supersaturation region(S) where the supercooling phenomenon occurs. Therefore, the latent heat release due to the phase change of the main steam in the supersaturation region(S) is promoted, and the supersaturation loss can be effectively suppressed.

REFERENCE SIGNS LIST

1: steam turbine
2: rotor
3: inner casing
3A: hole
4: stator blade
6: rotor blade
10: steam passage
11: turbine casing
18: turbine stage
20: nano water droplet supply device
22: nano water droplet conduit tube
22A: other end
24: nano water droplet spraying unit
25: nozzle
HA. HB: hatching
R: dashed double-dotted line
S: supersaturation region

The invention claimed is:

1. A steam turbine comprising:
a stator blade;
a rotor blade;
a turbine casing that accommodates the stator blade and the rotor blade; and
a nano water droplet supply device that supplies steam containing atomized water droplets to the turbine casing, the nano water droplet supply device being for supplying nano water droplets in which a $D_{10}$ particle size, which is an arithmetic average of particle sizes of the water droplets, is 0.5 μm or less, and a mass ratio to main steam flowing into the turbine casing is 0.01% or more and 0.5% or less, to the main steam.

2. The steam turbine according to claim 1,
wherein the nano water droplet supply device includes a nano water droplet spraying unit that is configured to spray the nano water droplets on an upstream side of a supersaturation region occurring in the turbine casing.

* * * * *